United States Patent [19]
Nishiya et al.

[11] Patent Number: 5,109,431
[45] Date of Patent: Apr. 28, 1992

[54] PATTERN DISCRIMINATION METHOD AND APPARATUS USING THE SAME

[75] Inventors: Takushi Nishiya, Machida; Motohisa Funabashi, Sagamihara; Kazuo Kera, Hitachi, all of Japan

[73] Assignee: Hitachi, Ltd., Tokyo, Japan

[21] Appl. No.: 526,000

[22] Filed: May 21, 1990

Related U.S. Application Data

[63] Continuation-in-part of Ser. No. 410,053, Sep. 20, 1989.

[30] Foreign Application Priority Data

Sep. 22, 1988 [JP] Japan ................... 63-236402
May 31, 1989 [JP] Japan ................... 1-136019

[51] Int. Cl.$^5$ ............................... G06K 9/62
[52] U.S. Cl. ........................ 382/30; 382/21; 382/47
[58] Field of Search ............... 382/21, 30, 34, 47, 382/9, 48, 16, 25; 364/715.07, 715.01, 807

[56] References Cited

U.S. PATENT DOCUMENTS

| | | | |
|---|---|---|---|
| 3,942,169 | 3/1976 | Fujimoto et al. | 382/21 |
| 4,566,124 | 1/1986 | Yamamoto et al. | 382/21 |
| 4,731,858 | 3/1988 | Grasmueller et al. | 382/21 |
| 4,748,675 | 5/1988 | Suzuki et al. | 382/21 |
| 4,905,295 | 2/1990 | Sato | 382/34 |
| 4,961,231 | 10/1990 | Nakayama et al. | 382/21 |
| 4,982,342 | 1/1991 | Moribe et al. | 382/21 |

FOREIGN PATENT DOCUMENTS 0063765 3/1982 Fed. Rep. of Germany.
0079251 5/1983 Fed. Rep. of Germany.

OTHER PUBLICATIONS

Niil, "Signal-to-Symbol Transformation: Reasoning in the HASP/SIAP Program", IEEE, ICASSP.3 (1984), pp. 39A.3.1-4.
Sakou et al., "An Algorithm for Matching Distant Waveforms Using A Scale-Based Description"; IAPR Workshop on CV, Oct. 12-14, 1988, pp. 329-334.

Primary Examiner—Joseph Mancuso
Attorney, Agent, or Firm—Antonelli, Terry, Stout & Kraus

[57] ABSTRACT

An apparatus for comparing a data pattern with standard patterns to discriminate the data pattern retrieves vector series of the standard patterns associated with the data pattern. Categorized names are assigned to data of the vector series so as to be respectively associated with elements of the data pattern, thereby determining a similarity degree and a scale factor between the vector series.

20 Claims, 11 Drawing Sheets

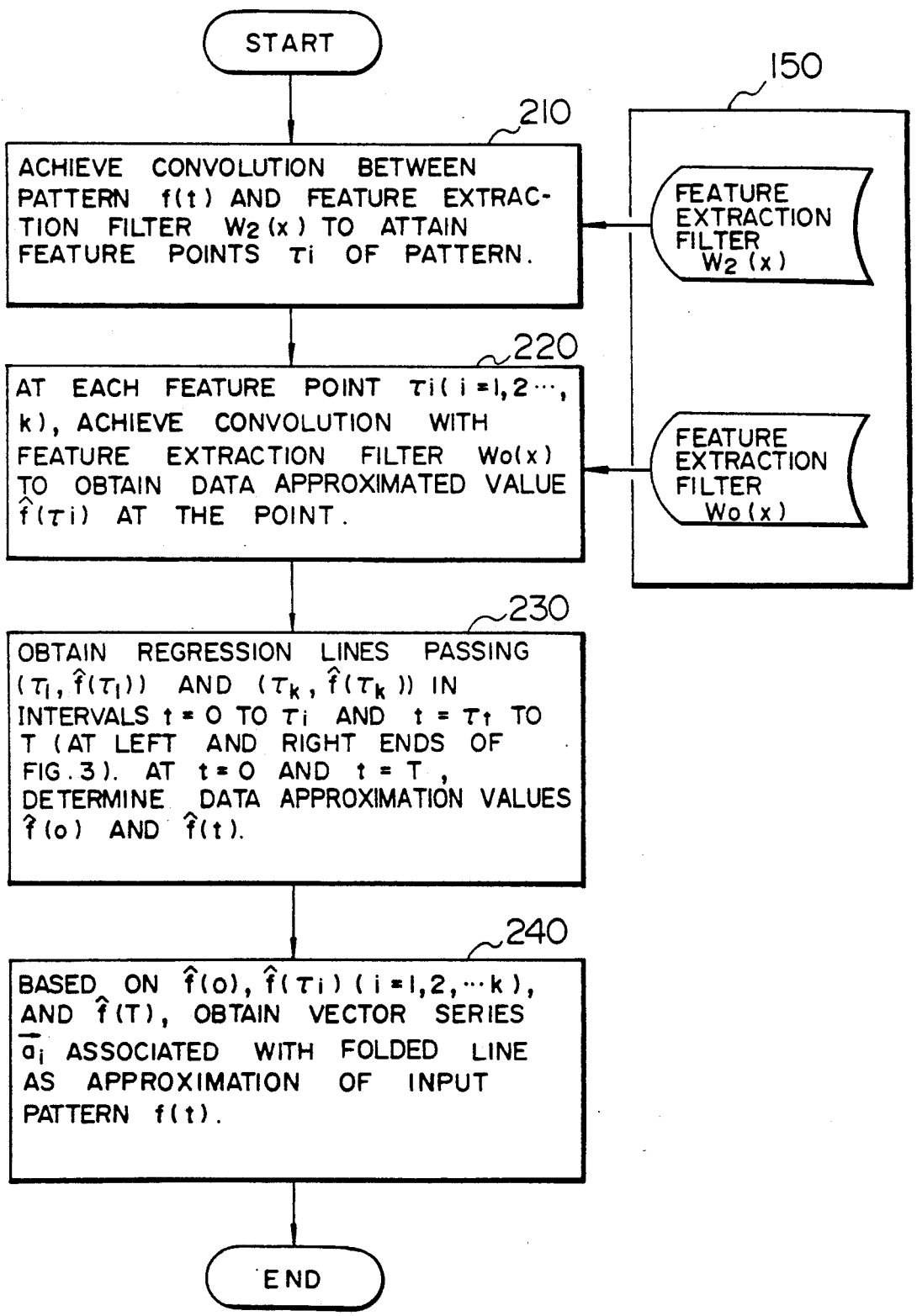
FIG. 2 FOLDED LINE APPROXIMATION

FIG. 3a
INPUT PATTERN
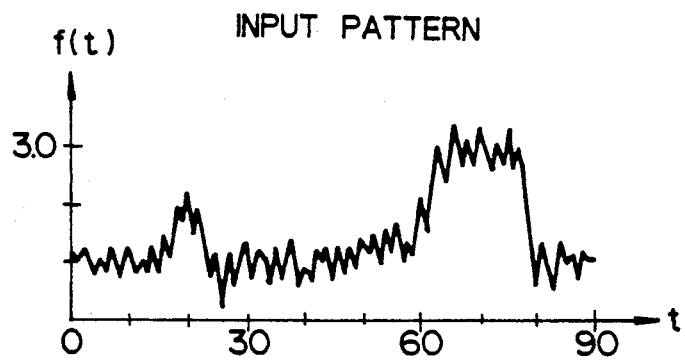
FIG. 3b
CONVOLUTION (g)
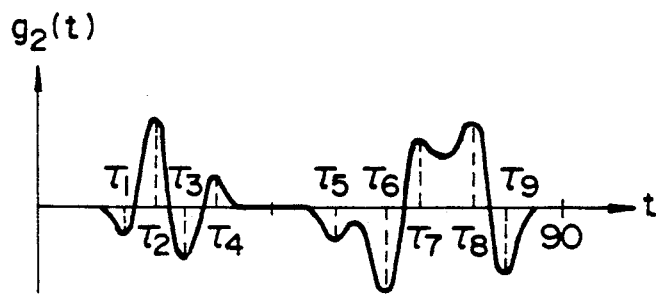
FIG. 3c
SERIES OF DATA CONNECTED
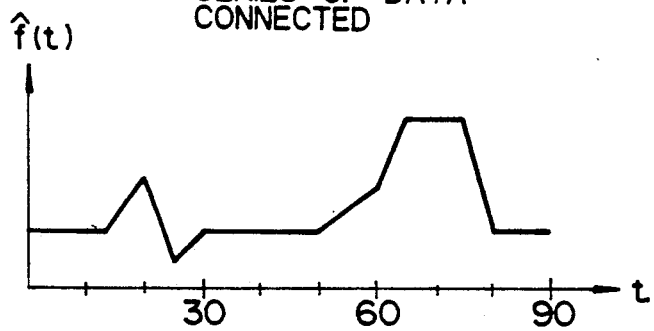
FIG. 3d
VECTOR SERIES
| i | 1 | 2 | 3 | 4 | 5 | 6 | 7 | 8 | 9 | 10 |
|---|---|---|---|---|---|---|---|---|---|---|
| $p_i$ | 13.0 | 7.0 | 5.0 | 5.0 | 20.0 | 10.0 | 5.0 | 10.0 | 5.0 | 10.0 |
| $q_i$ | 0.0 | 10.0 | -15.0 | 5.0 | 0.0 | 8.0 | 12.0 | 0.0 | -20.0 | 0.0 |

CONCAVITY/CONVEXITY FEATURE EXTRACTION FILTER

MEAN VALUE FEATURE EXTRACTION FILTER

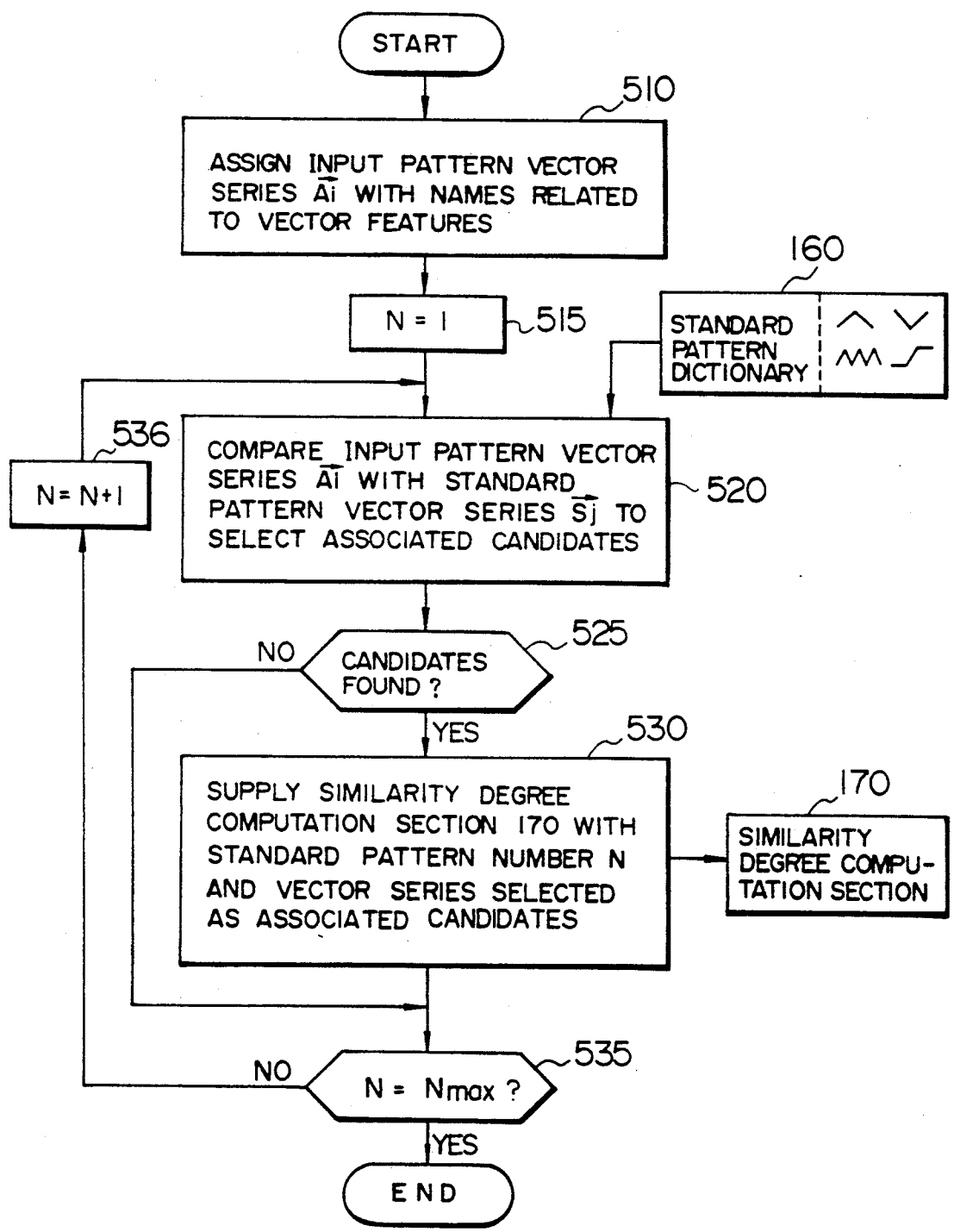
FIG. 5 DICTIONARY RETRIEVAL

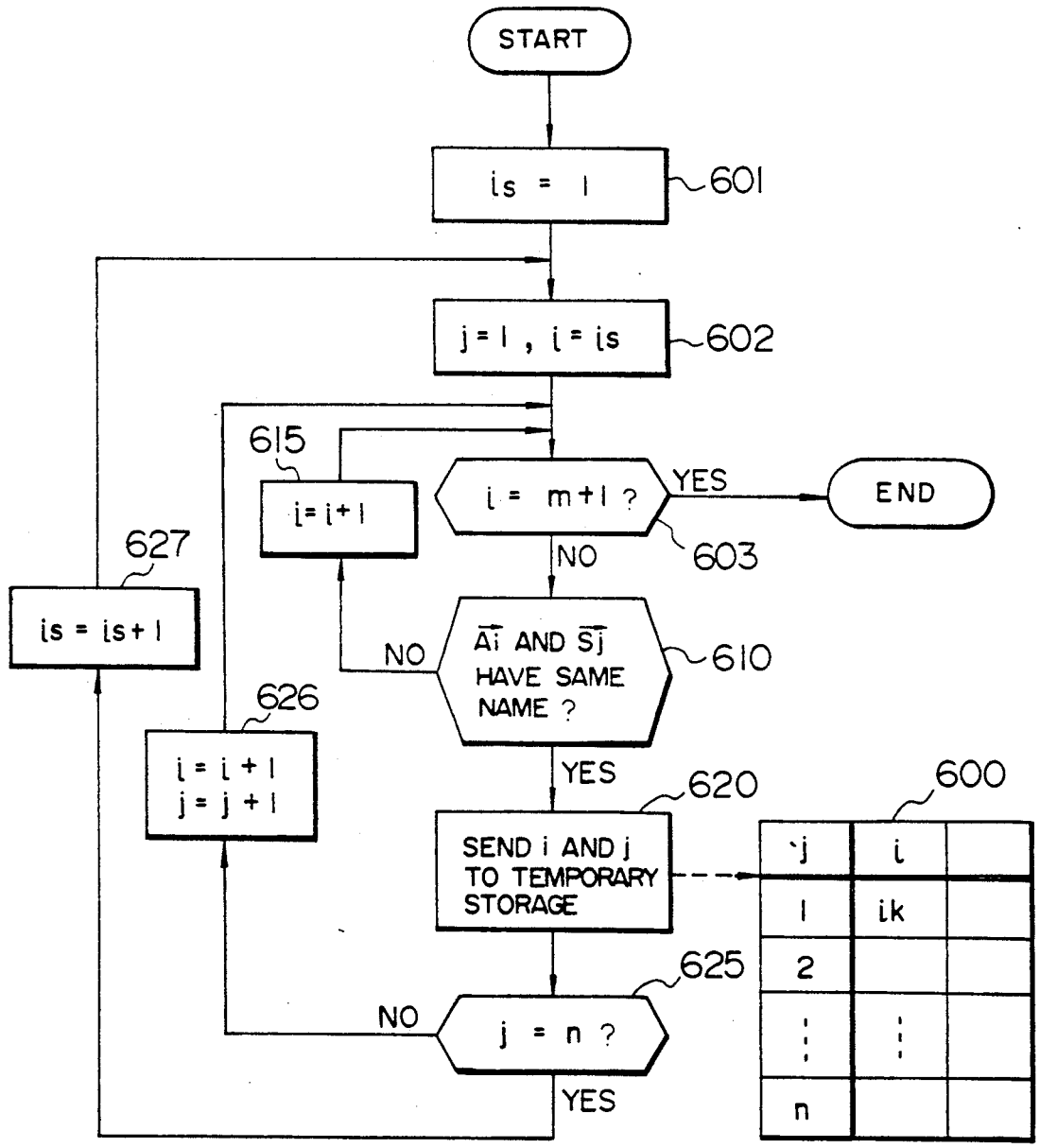

PSEUDO NEURAL NETWORKE

CONNECTION BETWEEN NERVE CELLS

DECISION OF CONNECTION STRENGTH

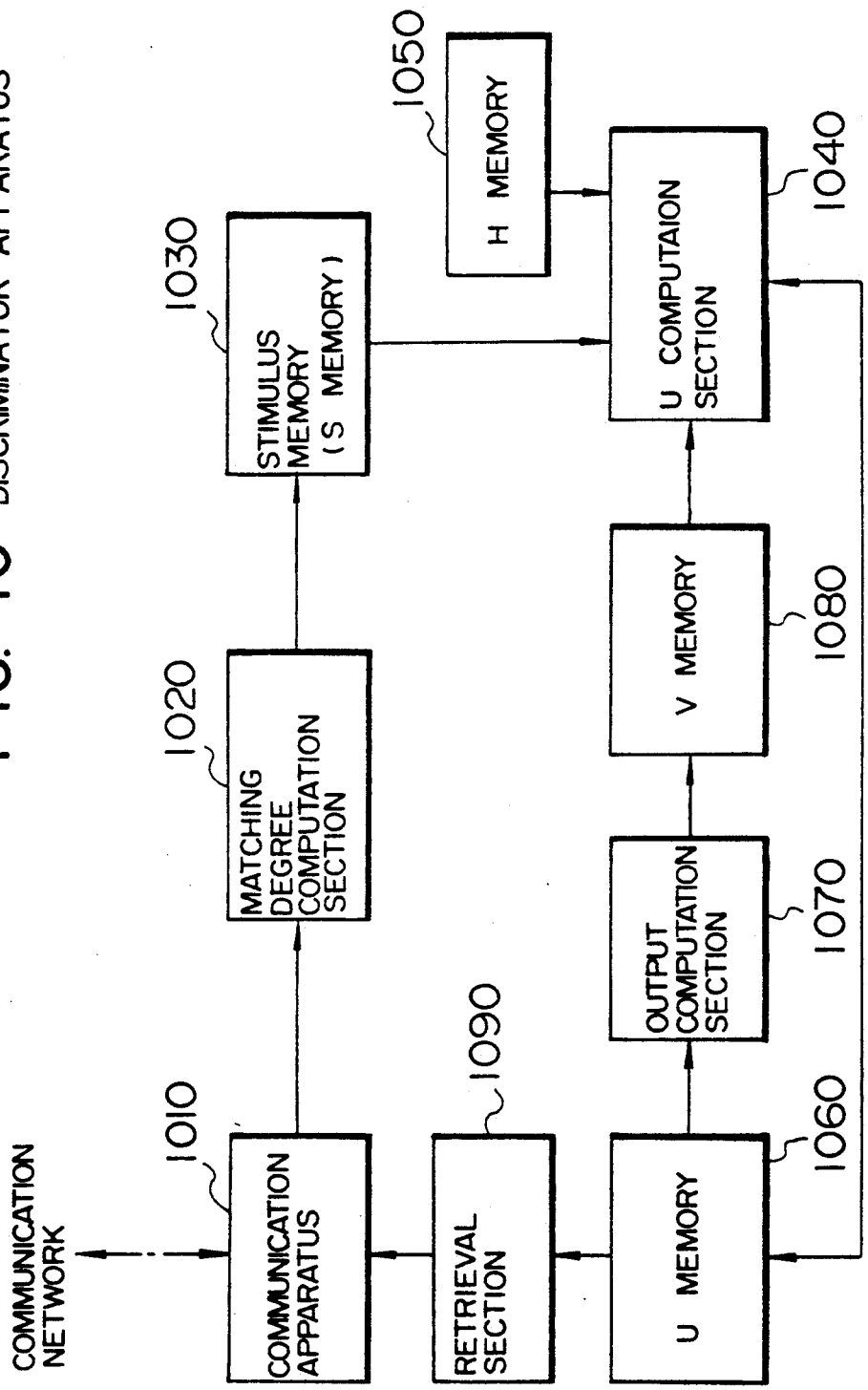
FIG. 10 DISCRIMINATOR APPARATUS

FIG. 11a  STANDARD PATTERN EXAMPLE
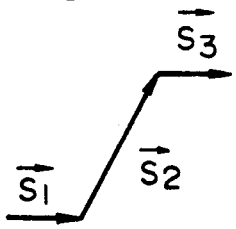
FIG. 11b
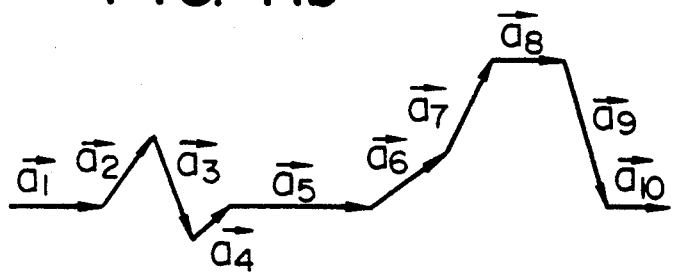
FIG. 11c
Sij PATTERN
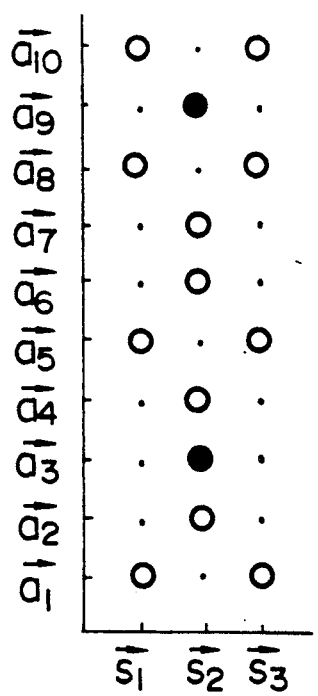
FIG. 11d
Uij PATTERN
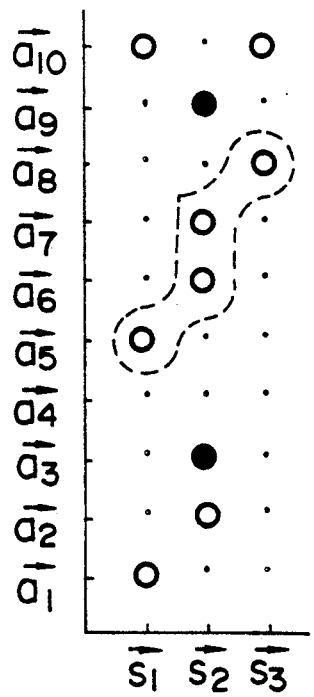

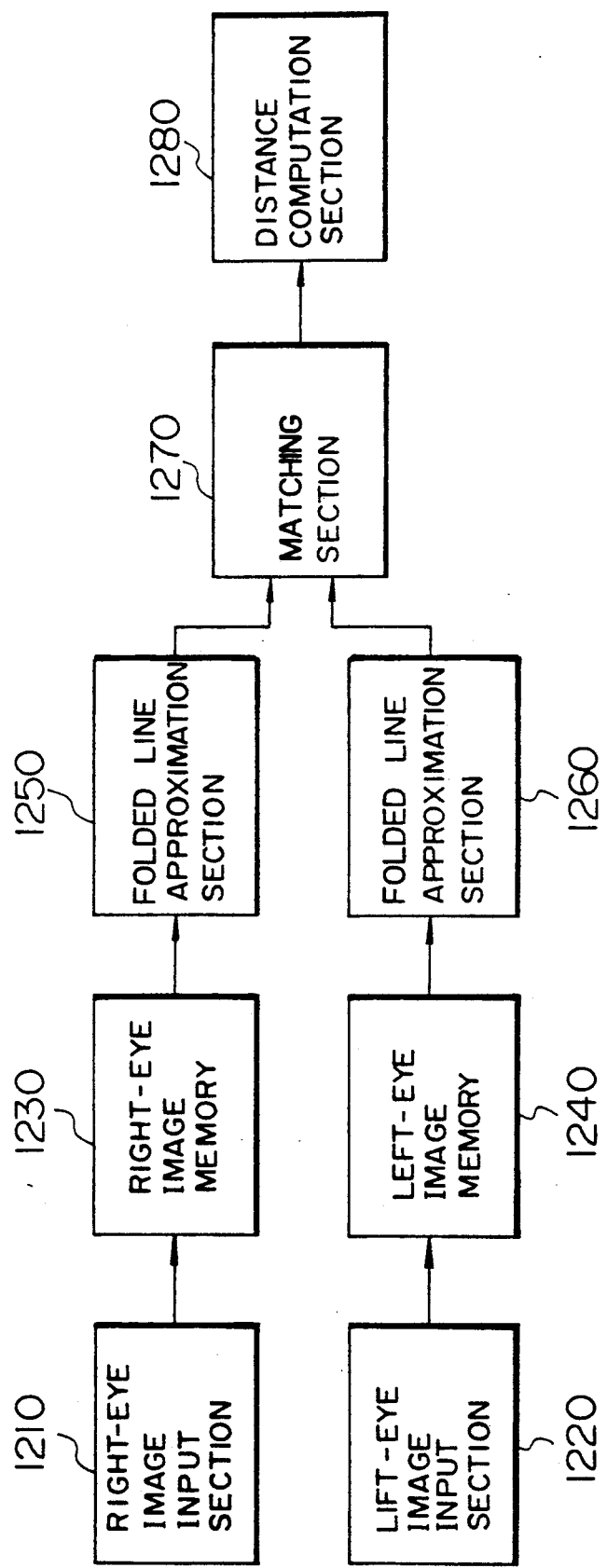
FIG. 12 DISTANCE MEASURING APPARATUS

PATTERN DISCRIMINATING APPARATUS

PATTERN DISCRIMINATION METHOD AND APPARATUS USING THE SAME

CROSS-REFERENCE OF RELEVANT PATENT APPLICATION

This application is a continuation-in-part of copending U.S. patent application Ser. No. 410,053 filed Sept. 20, 1989, the contents of which are incorporated herein by reference.

BACKGROUND OF THE INVENTION

The present invention relates to a method of and an apparatus for discriminating information including a pattern or a sequence of patterns.

When discriminating or identifying a measured pattern, there have been in general employed processing methods as follows. Namely, a method in which analogy or similarity is computed through a correlation analysis between an input pattern and registered standard patterns, a method using a Fourier transformation to attain a frequency component, and a method in which a regression line is attained have been commonly adopted. In the method achieving the correlation analysis, a sum of products is required to be computed from the measured patterns and the registered standard patterns. Since a great number of computations are necessary, when a large number of standard patterns are to be registered, a realtime pattern discrimination cannot be easily processed. Furthermore, when an input pattern analogous to a standard pattern is different in size from the standard pattern, the input pattern cannot be discriminated. In the method utilizing the Fourier transformation to obtain a frequency component, a pattern associated with a vibration or an oscillation can be discriminated. However, since this method does not handle a waveform itself, it has been difficult to identify a shape or contour of a pattern. In the method generating a regression line, a pattern is beforehand assumed to be a direct line to attain a line most analogous thereto. This method is hence attended with a problem that a complicated waveform cannot be appropriately discriminated.

Moreover, an apparatus has been put to practice in which an image attained from an image input apparatus such as an industrial television (ITV) camera is processed to measure a distance to the image. The representative processing of this apparatus has been limited to an operation in which the apparatus extracts portions (edges) where the brightness abruptly varies in the image to collate characteristic quantities of the edges with each other. Consequently, this method has a problem that the distance measurement can be achieved only with respect to the edges. In other words, the distance cannot be measured for the other portions, which constitute most portions of the image.

SUMMARY OF THE INVENTION

It is therefore an object of the present invention to provide a pattern discriminating apparatus in which analogous patterns having different sizes can be discriminated and in which the discrimination can be achieved with a reduced number of computations to accomplish realtime processing.

Another object of the present invention is to provide a pattern discriminating apparatus in which a distance can be measured from image information of an image for portions other than edges of the image.

Further, another object of the present invention is to provide a method and an apparatus suitable for a realtime processing of discrimination of a pattern in which in place of a combination of various methods such as a Fourier transformation, a correlation analysis, and a regression analysis, a single processing method is employed to discriminate various patterns having respective different properties.

Still another object of the present invention is to provide a pattern discriminating apparatus in which a degree of similarity can be correctly obtained for patterns having different sizes, thereby reducing the number of standard patterns to be prepared.

Further, another object of the present invention is to provide a method of and an apparatus for discriminating patterns in which patterns of state changes in a time-series fashion associated with a variation in speed of process measurement information can be used as dominant information to determine a state of the process.

Another object of the present invention is to provide a method of and an apparatus for discriminating patterns wherein the handling of interferences between variables which have been a bottleneck with respect to information in a process model construction and the limitation of numerical computations in a model associated with plural variables can be coped with by transforming states of the variables into abstract representations such as symbols.

Another object of the present invention is to provide a method of and an apparatus for discriminating patterns wherein process measurement data items in the past are accumulated together with event names associated therewith to retrieve at a high speed a preceding event analogous to an event appearing in a process operation by use of an event name, thereby coping with an abnormal condition based on the analogous operation data of the past.

Still another object of the present invention is to provide a man-machine interface having a high visibility capable of supplying information related to a process state by use of an abstract representation to be easily understood by a human.

Another object of the present invention is to provide a system which is installed in a financial institution, a stock company, a large-scale store, etc. to analyze variables, at least several tens of thousand in number, associated with sales information of items, stock prices, managing information, and the like, thereby deciding a management plan and an instruction for item transactions at a high speed.

Another object of the present invention is to provide a method of and an apparatus for discriminating patterns of measured process data suitable for computer management or control of complex processes such as a thermal process in an iron furnace and a reaction process in a chemical plant.

Another object of the present invention is to provide a distance measuring apparatus suitable for a monitoring system employing an ITV, etc., a visual system of an autonomously moving robot, and various kinds of measuring systems using an image.

In order to achieve the objects above, a pattern discriminating according to the present invention includes first means for approximating an input pattern by use of a broken line to transform the input pattern into a series or sequence of vectors constituting the broken line, second means for storing therein a standard pattern to be compared with the input pattern, said standard pattern being in a form of a broken line represented with a series of vectors, third means for comparing the vector series of the input pattern attained by said first means with the vector series of the standard pattern stored in said second means, and fourth means for computing a degree of similarity and a reduction factor between the vector series retrieved by said third means and the vector series of the standard pattern.

An apparatus according to the present invention may comprise means for receiving as inputs thereto vector series representing standard patterns and vector series expressing input patterns, means for comparing the respective vector series, and means for computing degrees of similarity and reduction factors between the respective vector series.

The first means for approximating an input pattern by use of a broken line to transform the input pattern into a series or sequence of vectors constituting the broken line can convert characteristics of a contour or shape of the input pattern into characteristic quantities (interval lengths, variation quantities, etc.) of the respective vectors. The amount of data representing the vector series is considerably smaller than those of the input patterns, the number of computations to discriminate the patterns can be minimized.

With the provision of the second means to store therein the standard patterns in a form of vector series of broken lines, the collating operation to discriminate the patterns can be transformed into a collating operation with respect to characteristics of the vector series. As a result, the pattern collating operation is simplified and errors associated with this operation are reduced.

By disposing the third means for comparing the vector series of the input pattern attained by said first means with the vector series of the standard pattern stored in said second means to retrieve from the vector series of the input patterns a sequence of vector series including a vector series of a standard pattern, patterns partially matching with each other and analogous patterns having different sizes can be easily extracted.

Thanks to the fourth means for computing a degree of similarity and a reduction factor between the respective vector series, similarity degrees of analogous patterns with different sizes and patterns partially similar to each other can be decided under a fixed standard. In consequence, the discrimination capability is remarkably improved.

Furthermore, the first means enables image information to be approximated to a broken line of luminance or brightness patterns for each scan line such that the image information can be transformed into a vector series for the subsequent processing. Since a correspondence relationship between images can be developed as a correspondence relationship between vector series, a distance measurement is conducted also in portions other than the edges, which has been impossible in the prior art.

BRIEF DESCRIPTION OF THE DRAWINGS

These and other objects and advantages of the present invention will become apparent by reference to the following description and accompanying drawings wherein:

FIG. 2 is a flowchart showing the operation in a broken line approximation section of FIG. 1;

FIGS. 3a to 3c and 3d are graphs and an explanatory diagram for explaining an example of operation of the broken line approximation section;

FIG. 5 is a flowchart showing the operation in the dictionary retrieval section of FIG. 1;

FIG. 6 is a flowchart showing the operation in a retrieval processing;

FIG. 10 is a block diagram schematically showing an embodiment of a discriminator apparatus according to the present invention;

FIGS. 11a, 11b, 11c, and 11d are schematic retrieval processing;

FIG. 12 is a block diagram showing an embodiment of a distance measuring apparatus according to the present invention.

DESCRIPTION OF THE PREFERRED EMBODIMENTS

Figure 1:
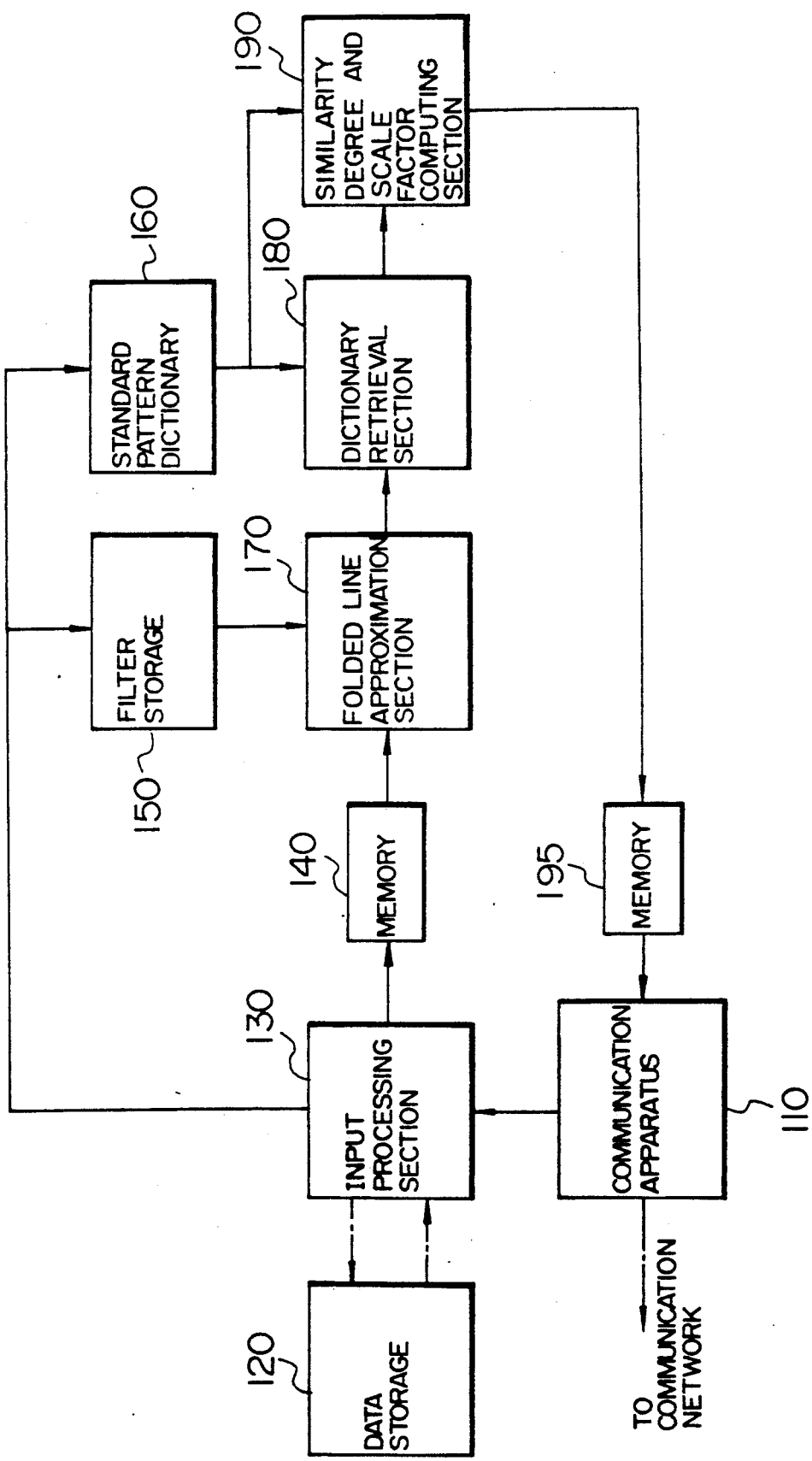
FIG. 1 is a block diagram schematically showing an embodiment of a pattern discriminating apparatus according to the present invention.

Referring now to drawings, a description will be given in detail of an embodiment of a pattern discriminating apparatus in accordance with the present invention. FIG. 1 is a block diagram of a pattern discriminating apparatus as the embodiment, which includes a communication apparatus 110, a data storage 120, an input processing section 130, memories 140 and 195, a filter storage 150, a standard pattern dictionary 160, a broken line or folded line approximation section 170, a dictionary retrieval section 180, and a similarity degree and scale reduction factor computing section 190. The communication apparatus 110 is disposed for receiving via a communication network such items of pattern data of a processing object as an identification number, a sampling period, a processing object interval, and a transformation coefficient. The data storage 120 is used to store therein, when employed in a process control field, pattern data of time series such as temperatures, pressures, and flow rates at the respective points of a process and pattern data varying in association with spatial locations such as a temperature distribution. In a fields related to financial transactions, securities, and distribution of items, the data storage 120 is loaded with time-series data including economic indices, sales information, management data items, etc. The input processing section 130 is initiated in response to a signal from the communication apparatus 110. This section 130 receives information items such as the identification number, the sampling period, and the processing interval from the communication apparatus 110 to access the data storage 120 so as to extract pertinent pattern data from the processing objective interval at the specified sampling period. The obtained data is sent to the memory 140. The filter storage 150 is used to store therein characteristic extracting filters to be employed in the broken line approximation section 170. The standard pattern dictionary 160 is loaded with standard patterns for discriminating input patterns, the standard patterns being in the form of vector series representing broken line approximations thereof. Each standard pattern possesses a sample of basic and typical data changes. The broken line approximation section 170 approximates an input pattern stored in the memory 140 to a broken line to transform the input pattern into vector series of line segments configuring the broken line. The dictionary retrieval section 180 compares a vector series of an input pattern sent from the broken line approximation section 170 with vector series of the standard patterns stored in the standard pattern dictionary 160 to retrieve vector series of associated candidates. the similarity degree and scale reduction factor computing section 190 computes similarity degrees and scale reduction factors between the vector series of the corresponding candidates attained by the dictionary retrieval section 180 and those of the standard patterns. For any vector series having a scale reduction factor within a preset range and a similarity degree not less than a predetermined value, this section 190 stores in the memory 195 a number assigned to the associated standard pattern and a number, a similarity degree, and a scale reduction factor of the vector series of the associated input pattern. The resultant data loaded in the memory 195 would be transmitted via the communication apparatus 110 to other processing apparatuses or software systems.

Next, a description will be given in detail of the operation of the pattern discriminating apparatus configured as above.

FIG. 2 is a flowchart showing the operation of the broken line approximation section 170. This flowchart primarily includes a pattern split processing step 210, a prediction processing step 220, an end point prediction processing 230, and a vector series computation processing step 240. The pattern split processing step 210 achieves a convolution on an input pattern f(t) and a feature or characteristic extracting filter $W_2(x)$ to compute concaves and convexes of the pattern so as to obtain a split or feature point $\tau_i$ at which the pattern is split into broken line segments. The prediction processing step 220 computes, by use of the feature extraction filter $W_0(x)$, a mean value of data in the vicinity of a split point of the pattern to obtain a prediction value $\hat{f}(\tau_i)$ of the data at the split point based on expressions, which will be described later. The end point prediction processing step 230 processes regression lines at both ends of a predetermined data interval to determine prediction values of the end points. The vector series computation processing step 240 computes, based on the split points and the prediction values of the end points, a vector series of each of the line segments of the broken line as an approximation of the pattern.

Figure 4A:
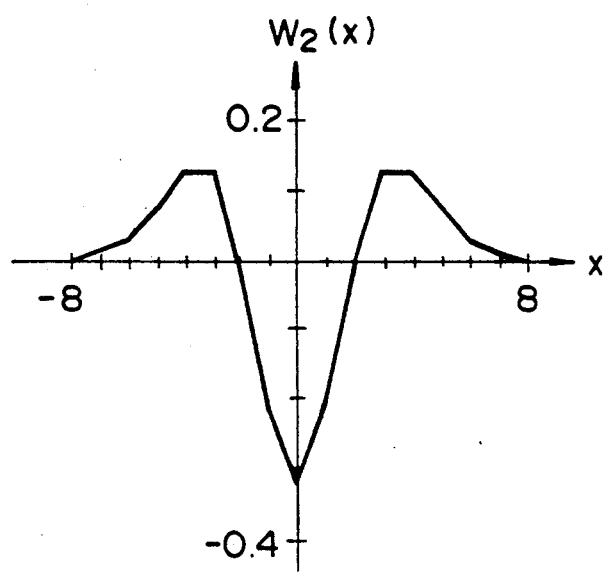
FIGS. 4a and 4b are graphs associated with examples of characteristic extracting filters.

First, the pattern split processing step 210 conducts a convolution for a sum of products on the input pattern data f(t) (t=0, 1, ..., T) by use of the feature extraction filter $W_2(x)$ stored in the filter storage 150 to determine a feature quantity $g_2(t)$ representing convexity and concavity of the pattern as follows.

$$g_2(t) = \sum_{x=-a}^{a} f(t + x)W_2(x) \quad (1)$$

where, a indicates a constant denoting the width of the filter. FIG. 3b shows a result of a convolution achieved on the example of an input pattern of FIG. 3a by use of the feature extracting filter $W_2(x)$ of FIG. 4a of which the total area value is substantially equal to one. Based on the computation result of the expression (1), the system extracts maximal and minimal points having values beyond a constant established in association with a magnitude of a change to be extracted, thereby determining split points $\tau_i$(i=1, 2, ..., k) of the input pattern. In the example of FIG. 3b, $\tau_i$ (i=1, 2, ..., 9) are obtained as the split points.

Next, the prediction processing step 220 of FIG. 2 achieves a convolution as follows at the split points $\tau_i$ attained by the pattern split processing step 210 by use of the feature extraction filter $W_0$ of which the total area value is substantially identical to 0 and which is stored in the filter storage 150, the filter representing a smooth change or a change on the average, thereby computing feature quantity $g_0(\tau_i)$ designating mean values.

$$g_0(\tau_i) = \sum_{x=-a}^{a} f(t + x)W_0(x) \quad (2)$$

Figure 4B:
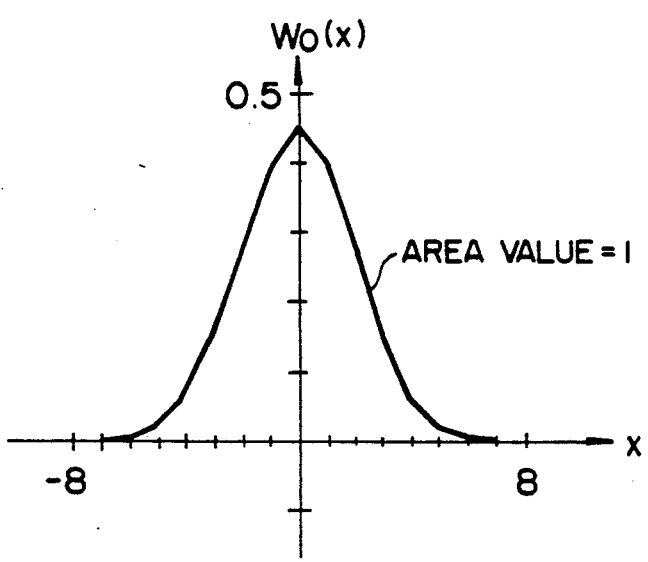

FIG. 4b shows an example of the feature extraction filter $W_0(x)$ At the split or feature points $\tau_i$, prediction values $(\tau_i)$ of the pattern are computed by use of the feature $g_2(\tau_i)$ denoting the concavity and convexity and the feature $g_0(\tau_i)$ designating mean values as follows.

$$\hat{f}(\tau_i) = W_0(O) \times g_0(\tau_i) + W_2(O)g_2(\tau_i) \quad (3)$$

Subsequently, the end point prediction processing step 230 computes prediction values of the end points of the input pattern. The system computes the regression lines passing the prediction values $(\tau_1, (\tau_1))$ and $(\tau_1, (\tau_1))$ associated with the feature points attained by the prediction processing step 220 by use of the following expressions.

$$\begin{cases} h_1(t) = \hat{f}(\tau_1) + d_1(t - \tau_1) & (4a) \\ d_1 = \dfrac{\sum\limits_{t=0}^{\tau_1} \{f(t) - \hat{f}(\tau_1)\}(t - \tau_1)}{\sum\limits_{t=0}^{\tau_1} (t - \tau_1)^2} & (4b) \end{cases}$$

$$\begin{cases} h_2(t) = \hat{f}(\tau_k) + d_2(t - \tau_k) & (5a) \\ d_2 = \dfrac{\sum\limits_{t=\tau_k}^{T} \{f(t) - \hat{f}(\tau_k)\}(t - \tau_k)}{\sum\limits_{t=\tau_k}^{T} (t - \tau k)^2} & (5b) \end{cases}$$

Assigning the values of the end points of the input pattern i.e. t=0 and t=t to the expressions (4a) and (5a), the prediction values $(0)(h_1(0))$ and $(T)(h_2(T))$ are obtained for the end points of the input pattern. FIG. 3c shows the predicted values of the characteristic points and the end points of the input pattern.

Next, the vector series computation processing step 240 computes as follows a vector series $a_j = (p_j, q_j)$ as an approximation to the input waveform from the sequence of points (0, (0)), $(\tau_i, (\tau_i))$ (i=1, 2, ..., k), and (T, (T)).

$$\begin{cases} \vec{a_1} = (\tau_1, \hat{f}(\tau_1) - \hat{f}(0)) \\ a_i = (\tau_i - \tau_{i-1}, \hat{f}(\tau_i) - \hat{f}(\tau_{i-1})) \\ a_{k+1} = (T - \tau_k, \hat{f}(T) - \hat{f}(\tau_k)) \end{cases} \quad (6)$$

-continued $$i = 2, 3, \ldots, k$$

FIG. 3d shows a vector series attained from the example of the sequence of points of FIG. 3c.

FIG. 5 is a flowchart showing the operation of the dictionary retrieval section 180. The standard pattern dictionary 160 is loaded with data items of patterns in an order of numbers assigned to each standard pattern. Moreover, the vectors constituting the respective vector series are designated with names representing vector characteristics. For example, depending on a gradient of vectors, names such as "ascending", "descending", and "equilibrium" may be assigned to the vectors. First, a step 510 assigns each vector of the vector series $\vec{a}_i$ constituting an input pattern with a name similar to a name designated to a standard pattern. Subsequently, a step 515 establishes N=1 for an initiation of a retrieval. A retrieval step 520 selects from the vector series of the input pattern analogous to the standard pattern, the selected series being candidates for the processing. When any candidate is present, a step 525 passes control to a transmission processing step 530, which supplies a similarity degree computing section 190 with a number N of the standard pattern and the vector series as the associated candidate. When the candidate is missing, a step 535 determines whether or not the retrieval has been completely achieved for all standard patterns. (The number of standard patterns is assumed to be represented as Nmax.) If this is not the case, a step 536 updates the dictionary number through N=N+1, and then the retrieval processing step 520 continuously accomplishes the retrieval for the next standard pattern.

FIG. 6 is a flowchart useful to explain in detail the operation in the retrieval processing step 520. First, a step 601 sets $i_s=1$ to search for a standard pattern vector associated with a first vector of the input pattern. Next, a step 602 establishes j=1 and i=$i_s$ to commence a retrieval. If the vector number of the input pattern is m+1, a step 603 determines to end the retrieval; otherwise, a step 610 compares the name of the input pattern vector $\vec{a}_i$ with that of the standard pattern vector $\vec{s}_j$. When these names do not match each other, a step 615 is executed to prepare for a comparison between the next input pattern vector and the standard pattern vector. When a matching condition takes place, a step 620 stores a pair of $\vec{a}_i$ and $\vec{s}_j$ in a temporary storage 600. A step 625 then determines whether or not the retrieval has been finished for all vectors of the standard pattern. In a case of j≠n, a step 626 sets i=i+1 and j=j+1 for the subsequent retrieval. If j is equal to n, a step 627 establishes $i_s=i_k+1$ to achieve a retrieval beginning from the $i_s$-th input vector based on the standard pattern. In the expression above, $i_k$ stands for a number assigned to a vector of the latest input pattern having a name identical to the name of the standard pattern vector $\vec{s}_1$. Namely, $i_k$ indicates a number of the latest input pattern vector associated with $\vec{s}_1$ in the series of associated candidates stored in the temporary storage 600.

The similarity degree computating section 190 computes as follows similarity degrees and scale reduction ratios or factors between the input patterns and the standard patterns depending on the contents of the temporary storage 600 of FIG. 6.

$$S = \frac{\sum_{i=1}^{m} \left( \vec{s}_i, \sum_{j=1}^{n_i} \vec{a}_{ij} \right)}{\sqrt{\sum_{i=1}^{m} |\vec{s}_i|^2} \sqrt{\sum_{i=1}^{m} \left( \sum_{j=1}^{n_i} |\vec{a}_{ij}|^2 \right)}} \quad (7)$$

$$K = \frac{\sum_{i=1}^{m} \left( \vec{s}_i, \sum_{j=1}^{n_i} \vec{a}_{ij} \right)}{\sum_{i=1}^{m} |\vec{s}_i|^2} \quad (8)$$

Where, $\vec{s}_i$ (i=1, 2, ..., m) is a vector series of standard patterns and $\vec{a}_{ij}$ specifies associated candidates of an input pattern vector series. In the expressions above, the vector series $\vec{s}_i$ corresponds to the candidates $\vec{a}_{ij}$ (i=1, 2, ..., $n_i$). In the expression (7), a letter S is used to compute a correlation coefficient between vector series. The value of S is 1.0 when two patterns are completely analogous to each other. The expression (8) is employed to attain a value (scale) of a scale reduction ratio or factor when the vector series of an input pattern matches with that of the standard pattern with the greatest matching degree therebetween. The similarity degree computing section 190 stores in the memory 195 the vector series having the similarity degree and the scale reduction ratio in the following predetermined ranges with respect to the standard patterns in a descending order of similarity degrees.

$$S \geq S_{min}, K_{min} \geq K \geq_{max} \quad (9)$$

In accordance with this embodiment, the system can retrieve candidates of input patterns matching with the standard patterns based on the name of the respective vectors. This leads to advantages that the number of computations is reduced and that the candidates can be retrieved with a minimized number of errors. Furthermore, since a correlation coefficient is computed between vector series to attain a similarity degree, there are attained advantageous features that analogous patterns can be retrieved and the number of patterns of the standard pattern dictionary 160 can be reduced.

For a deeper understanding of the present invention and for evaluation of the potential and advantage inherent thereto, the mathematical background and fundamentals will be next described in association with methods employed to implement the present invention. Expressions and formulae introduced in accordance with the methods will also give an implication to functions of the embodiment.

A description will be given of a method of setting the feature extraction filters $W_2(x)$ and $W_0(x)$ which are stored in the filter storage 150 and which are used in the broken line or folded line approximation section 170. The filters $W_2(x)$ and $W_0(x)$ are disposed to attain general convexity and concavity of a pattern and a mean value thereof, respectively.

For developing or expanding pattern data, a polynomial $H_m(x)$ is defined as follows.

$$H_m(x) = (-1)^m E(x) \frac{d^n E(x)}{dx^n} \quad (10)$$

-continued $$\sum_{x=a}^{b} \{H_m(x)H_n(x)\}E(x) = 0 (m \neq n) \quad (11)$$

Where, E(x) stands for an arbitrary differentiable function, for example, an exponential function which is differentiated into a polynomial; and a and b denote constants indicating definition intervals. In this regard, assuming $$\sum_{x=a}^{b} \{(H_m(x))^2 E(x) = A. \quad (12)$$

there is attained a system of orthonormal functions as follows.

$$\psi_m(x) = \frac{1}{\sqrt{A_m}} H_m(x) \{E(x)\}^{\frac{1}{2}} \quad (13)$$

$$(m = 0, 1, 2 \ldots)$$

When expanding the pattern data f(t) in the neighborhood of a point of time t by use of the orthonormal function system $\omega_m(x)$, in order to attain a satisfactory approximation of the original data, it is necessary to develop the pattern data f(t) to a high degree. To avoid such an operation, the pattern data is transformed arount $t=t_0$ as follows.

$$h(t_0+x) = f(t_0+x)\{E(x)\}^{\frac{1}{2}} \quad (14)$$

The expression (14) is then reduced to a system of orthonormal functions of the expression (13).

$$h(t_0 + x) = \sum_{m=0}^{\infty} a_m \psi_m(x) \quad (15)$$
$$= \sum_{m=0}^{\infty} a_m \frac{H_m(x)}{\sqrt{A_m}} \{E(x)\}^{\frac{1}{2}}$$

Where, $$a_m = \sum_{x=a}^{b} h(t_0 + x)\psi_m(x) \quad (16)$$

Based on the expressions (14) and (15), the input pattern f(t) is expanded into the following polynomial in the neighborhood of time $t=t_0$.

$$f(t_0 + x) = \sum_{m=0}^{\infty} a_m \frac{H_m(x)}{\sqrt{A_m}} \quad (17)$$

Assuming the differentiable function E(x) to be expressed with a exponential function $$E(x) = \exp\left(-\frac{x^2}{2\sigma^2}\right) \quad (18)$$

the function $H_m(x)$ become to be a polynomial of degree m. To attain the expansion filter $W_m(x)$ in this situation, the expressions (13) and (14) are assigned to the expression (16) as follows.

$$a_m = \sum_{x=a}^{b} f(t_0 + x) \frac{H_m(x)}{\sqrt{A_m}} E(x) \quad (19)$$

This leads to the expansion filter $W_m(x)$ as follows.

$$W_m(x) = \frac{H_m(x)}{\sqrt{A_m}} E(x) \quad (20)$$

FIG. 4 shows contours of $W_0(x)$ and $W_2(x)$ when the constant $\sigma$ is 2.0. When the value of $\sigma$ varies between data items, the values thereof associated with the respective data items may be stored in the filter storage 150 to generate the feature extraction filters for the polynomial expansion when necessary. Alternatively, some types or kinds of $\sigma$ values may be computed in advance to be stored in the filter storage 150.

For a prediction of data at $t=t_0$ based on the result of the polynomial expansion by use of the feature extraction filters of the expression (20), when is assigned to x, the data is obtained as follows.

$$f(t_0) = \sum_{m=0}^{\infty} a_m \frac{H_m(0)}{\sqrt{A_m}} \quad (20)$$

$$= \sum_{m=0}^{\infty} a_m W_m(0) \quad (21)$$

The expressions (7) and (8) respectively of the similarity degree S and the scale reduction ratio K are obtained as follows. Let us assume that the standard pattern vector series and the input pattern vector series to be compared with the standard pattern vector series are represented as $\vec{s}_i (i=1, 2, \ldots, m)$ and $\vec{a}_i (i=1, 2, \ldots, m)$, respectively. Multiplying the standard pattern vector series by K, a square error between the standard and input patterns is expressed as $$E = \sum_{i=1}^{m} |K \cdot \vec{s}_i - \vec{a}_i|^2 \quad (22)$$

Let us first attain a scale reduction factor K for which the square error E takes a minimum value. The expression (22) is expanded into $$E = K^2 \sum_{i=1}^{m} |\vec{s}_i|^2 - 2K \sum_{i=1}^{m} (\vec{s}_i, \vec{a}_i) + \sum_{i=1}^{m} |\vec{a}_i|^2 \quad (23)$$

where, (,) indicates an operation of an inner product. expression (23) is a quadratic expression in which a coefficient of $K^2$ is positive, a scale reduction ratio K associated with the minimum value of the square error E is obtained through a computation of $$\frac{\partial E}{\partial K} = 2K \sum_{i=1}^{m} |\vec{s}_i|^2 - 2 \sum_{i=1}^{m} (\vec{s}_i, \vec{a}_i) \quad (24)$$

$$K = \frac{\sum_{i=1}^{m} (\vec{s}_i, \vec{a}_i)}{\sum_{i=1}^{m} |\vec{s}_i|^2} \quad (25)$$

The similarity degree here is obtained by assigning the expression (25) to the expression (23).

$$E = \sum_{i=1}^{m} |\vec{a_i}|^2 - \frac{\left(\sum_{i=1}^{m} (\vec{s_i}, \vec{a_i})\right)^2}{\sum_{i=1}^{m} |\vec{s_i}|^2} \qquad (26)$$

Normalizing E of the expression (26) with respect to the input pattern vector series, $$E = 1 - \frac{\left(\sum_{i=1}^{m} (\vec{s_i}, \vec{a_i})\right)^2}{\sum_{i=1}^{m} |\vec{s_i}|^2 \sum_{i=1}^{m} |\vec{a_i}|^2} \qquad (27)$$

is attained. To search for a standard pattern for which the expression (27) develops a minimum value is identical to finding a standard pattern for which the following expression takes a maximum value.

$$S = \frac{\sum_{i=1}^{m} (\vec{s_i}, \vec{a_i})}{\sqrt{\sum_{i=1}^{m} |\vec{s_i}|^2} \sqrt{\sum_{i=1}^{m} |\vec{a_i}|^2}} \qquad (28)$$

In the expression (27), the similarity degree increases also for the vectors having the opposite direction; whereas, in the expression (28), the similarity degree becomes greater only for the vectors having the same direction. The similarity degree S of the expression (28) explicitly satisfies the condition $-1 \leq S \leq 1$.

In the description above, there exists a one-to-one correspondence between the input pattern vector series and the vector series of the standard pattern dictionary. In general, a vector of a standard pattern may correspond to a plurality of input pattern vectors. In such a case, the similarity degree S and the scale reduction factor K would be transformed as follows.

$$S = \frac{\sum_{i=1}^{m} \left(\vec{s_i}, \sum_{i=1}^{n_i} \vec{a_{ij}}\right)}{\sqrt{\sum_{i=1}^{m} |\vec{s_i}|^2} \sqrt{\sum_{i=1}^{m} \left(\sum_{j=1}^{n_i} |\vec{a_{ij}}|\right)^2}} \qquad (29)$$

$$K = \frac{\sum_{i=1}^{m} \left(\vec{s_i}, \sum_{j=1}^{n_i} \vec{a_{ij}}\right)}{\sum_{i=1}^{m} |\vec{s_i}|^2} \qquad (30)$$

where, the vector $\vec{s_i}$ of a standard pattern corresponds to vector series $\vec{a_{ij}}$ (j=1, 2, ..., $n_i$) of an input pattern.

Referring now to FIGS. 7 to 10 and 11a to 11d, a description will be given of an alternative embodiment of the dictionary retrieval section 180 for retrieving matching portions of the input pattern vector with respect to the standard pattern vector series.

Figure 7:
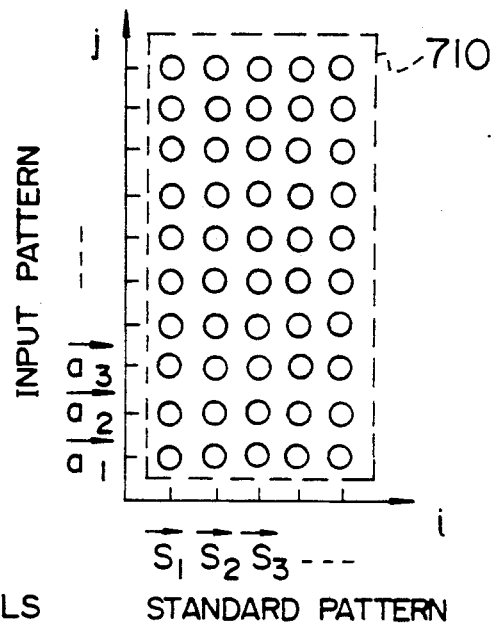
FIG. 7 is a schematic diagram showing a pseudo nerve or neural net.

First, referring to FIGS. 7 to 9, the background of the embodiment will be described. FIG. 7 shows a pseudo nerve or neural net 710 comprising neural cells indicated with circles. The abscissa and ordinate respectively correspond to a vector series of a standard pattern stored in the standard pattern dictionary 160 and a vector series of an input pattern. When the standard pattern vector series $\vec{s_i}=(p_i, q_i)$, (i=1, 2,..., m) and the input pattern vector series $\vec{a_j}=(p_j, q_j)$, (j=1, 2, ..., n) are supplied to the pseudo neuro net 710, the respective neural cells receive stimulation inputs depending on the matching degrees associated with the corresponding vectors. For example, in a case where the matching degree is defined in terms of an inner product, a stimulation input S(i,j) to be given to a neural cell at a position (i,j) is expressed with an inner product between $\vec{s_i}$ and $\vec{a_j}$.

$$S(i,j) = (\vec{s_i}, \vec{a_j}) = p_i p_j + q_i q_j \qquad (31)$$

Figure 8:
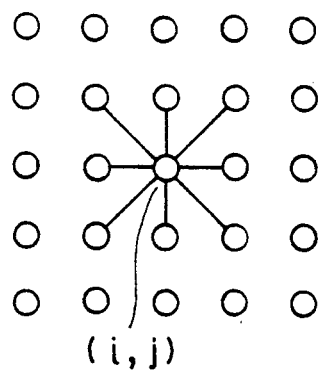
FIG. 8 is a diagram illustratively showing linkages between nerve cells.

The respective neural cells are linked with each other as shown in FIG. 8 and hence are influenced from excitation levels of neural cells in the periphery thereof. In the example of FIG. 8, a neural cell at the position (i,j) receives an input from each of eight neural cells around the periphery thereof. However, a pseudo neural net having a wider linkage between neural cells may also be treated. Representing a linkage intensity or strength between a neural cell at the position (i,j) and a neural cell at a position (i',j') to be W(i,j;i',j'), an excitation level U(i,j;t) and an output level V(i,j) of the neural cell at the position (i,j) are computed as follows.

$$\tau \frac{\partial U(i,j;t)}{\partial t} = -U(i,j;t) + \sum_{k,l} W(i,j;i',j')V(i',j';t) + \qquad (32)$$

$$S(i,j) - H(i,j)$$

$$V(i,j;t) = f[U(i,j;t)] \qquad (33)$$

where, $\tau$ stands for an appropriate time constant and H(i,j) designates a threshold value at which the associated neutral cell is excited. For the computation, the expression (32) may also be transformed into a discrete form.

$$U(i,j;t+1) = A_1 U(i,j;t) + \qquad (34)$$

$$A_2 \left\{ \sum_{k,l} W(i,j;i',j')V(i',j';t) + S(i,j) - H(i,j) \right\}$$

Moreover, f(x) denotes a function representing a relationship between an input and an output associated with the neural cell and may be a logistic function, for example.

$$f(x) = \frac{1}{1 + \exp(-\alpha x + \theta)} \qquad (35)$$

($\alpha, \theta$; constant)

The pseudo neural net develops a function to discriminate a standard pattern vector series $\vec{s_i}$ from the input pattern vector series $\vec{a_j}$. In other words, this net determines vector series satisfying the following conditions.

(1) A vector of the series $\vec{s_i}$ may consecutively correspond to a plurality of vectors of the series $\vec{a_j}$.

(2) The corresponding sequence between the vector series $\vec{s_i}$ and $\vec{a_j}$ is not allowed.

In order to detect an excitation pattern satisfying these conditions, the linkage intensity values between a neural cell at the position (i,j) and neural cells in the proximity thereof are determined as follows. Namely, the neural cells of which the correspondence sequence of the vector series is not exchanged with respect to time even when the cells are excited at a timing of the excitation of the neural cell at the position (i,j), namely, the neuro cells at positions (i−1,j), (i−1,j−1), (i+1,j+1), and (i+1,j) are assigned with an exciting (positive) linkage. The neural cells of which the correspondence sequence of the vector series is exchanged with respect to time when the cells are excited at a timing of the excitation of the neural cell at the position (i,j), namely, the neural cells at positions (i,j+1), (i−1,j+1), (i,j−1), and (i+1,j−1) are assigned with a suppressing (negative) linkage. In FIG. 9, the exciting and suppressing linkages are indicated with white and black bold lines, respectively.

FIG. 10 is a block diagram showing an embodiment of a discriminator apparatus configured in accordance with the principle of the present invention. This system includes a communication apparatus 1010, a matching degree computation section 1020, a stimulus (S) memory 1030, a U computation section 1040, an H memory 1050, a U memory 1060, an output computation section 1070, a V memory 1080, and a retrieval processing section 1090. The communication apparatus 1010 receives from other processing apparatus or a software system a vector series of an input pattern and a vector series of a standard pattern for a retrieval. The matching degree computation section 1020 computes a matching degree $S(i,j)$, $(i=1, 2, \ldots, m; j=1, 2, \ldots, n)$ between a vector series $\bar{s}_i (i=1,2, \ldots, m)$ of a standard pattern dictionary and a vector pattern $\bar{a}_j (j=1, 2, \ldots, n)$ of an input pattern. The S memory is disposed to store therein the value of $S(i,j)$ as a result of the processing of the matching degree computation section 1020. The U computation section 1040 receives the matching degree $S(i,j)$ from the S memory 1030, a threshold value $H(i,j)$ from the H memory 1050, an output level $V(i,j)$ of each neural cell from the V memory 1080, and an excitation level $U(i,j)$ of the neural cell from the U memory 1060 to conduct a computation of the expression (34), thereby updating the excitation levels $U(i,j)$ of the respective neural cells. The updated levels $U(i,j)$ of the cells are loaded in the U memory 1060. After the U computation section 1040 repeatedly conducts the computation an appropriate number of times, the retrieval processing section 1090 receives the excitation levels $U(i,j)$ of the respective neural cells from the U memory 1060 to search for a position of a neural cell having a higher excitation level along the linkage direction of the excitation so as to determine a correspondence relationship between the vector series.

When the communication apparatus 1010 receives a signal from other apparatus, the constituent components of the pattern discriminator of FIG. 10 operate as follows.

1) The matching degree computing section 1020 computes a matching degree between the respective vectors of the received vector series to store the result in the S memory 1030.

2) The H memory 1050 is loaded with an appropriate threshold value $H(i,j)$ and then the output levels $V(i,j)$ of the V memory 1080 are set to 0. Moreover, the excitation levels $U(i,j)$ of the neural cells are set to 0.

3) The U computation section 1040 reads out the contents of the U memory 1060, the V memory 1080, and the H memory 1050 to compute new values of the excitation levels $U(i,j)$ of the neural cells, thereby loading the obtained values in the U memory 1060.

4) The output computation section 1070 gets the neural cell excitation levels from the U memory 1060 to compute neural cell output levels $V(i,j)$ based on a predetermined input/output function.

5) The processing steps 3) and 4) are iteratively accomplished a proper number of times until the excitation levels $U(i,j)$ of the neural cells reach an equilibrium state.

6) The retrieval section 1090 reads from the U memory the excitation levels $U(i,j)$ of the neural cells to search for a neural cell having a higher excitation level along the direction of the excitation so as to determine a correspondence relationship between the vector series.

FIGS. 11a to 11d show examples of results from the dictionary retrieval processing in this embodiment. FIG. 11a shows an example of a standard pattern vector series stored in the dictionary, whereas FIG. 11b shows an example of an input pattern vector series. FIG. 11c shows a pattern of stimulation or stimulus inputs $S_{ij}$ associated with the vector series $\bar{s}_i (i=1, 2, 3)$ of FIG. 11a and the vector series $\bar{a}_j (J=1, 2, \ldots, 10)$ of FIG. 11b. Neural cells receiving a large positive stimulus input and a large negative stimulus input are indicated with O and ● respectively. The other neural cells are denoted with dots. On receiving the stimulation inputs, the respective neural cells are excited and hence change the associated excitation levels in accordance with the expression (34). FIG. 11d shows the excitation levels $U(i,j)$ of the respective cells in the equilibrium state. Like in FIG. 11c, neural cells receiving a large positive stimulus input and a large negative stimulus input are indicated with O and ●, respectively. The other neural cells are denoted with dots. Neural cells at positions (1,1) and (2,2) mutually retain excitation states via an exciting linkage therebetween. As constant thereto, a neural cell at a position (3,1) has a suppressing linkage with the cell at the position (2,2) and hence is at a low excitation level. Neural cells at positions (1,5), (2,6), (2,7) and (3,8) are related through an exciting linkage therebetween and therefore develops a high excitation level. In association therewith, nerve cells at positions (2,4) and (2,5) are respectively connected to the neural cells at the positions (2,4) and (2,6) through a suppressing or restraint linkage therebetween and thus possess a low excitation level. Moreover, a neural cell at a position (1,8) is suppressively linked with the cell at the position (2,7) and hence has a low excitation level.

Figure 9:
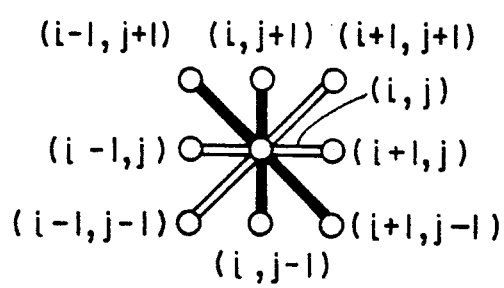
FIG. 9 is a diagram showing strengths of linkages between nerve cells.

From the excitation pattern of FIG. 11d, when a retrieval is achieved, in a sequence of neural cells connected along the direction of the exciting linkage of FIG. 9, for a portion including the input pattern vector series corresponding to all items of $\bar{s}_j (j=1, 2, 3)$, there is attained a portion enclosed with a dashed line in FIG. 11d. As a result, of the vector series $\bar{a}_j (j=1, 2, \ldots, 10)$ of the input pattern of FIG. 11b, the system selects the following correspondence relationships as candidates of the portion including the vector series $\bar{s}_i (i=1, 2, 3)$ of the standard pattern of FIG. 11a.

$\overline{s_1 a_5}$ $\overline{s_2 a_6, a_7}$ $\overline{s_3 a_8}$

In the example above, only one portion is assigned as the candidate. However, the present embodiment is naturally applicable to a case where a plurality of candidate portions are found.

When the equilibrium of the cell excitation levels is attained through the computation of the expression (34), if the candidate cannot be uniquely determined like in the case of FIGS. 11a to 11d, namely, if a plurality of combinations including a vector series associated with the input pattern vector series are found, H(i,j) of the expression (34) and the values of $\alpha$ and $\theta$ of the expression (35) need only be changed to attain a new equilibrium state, thereby uniquely determining the associated candidates including the same vector series.

According to the present embodiment, the correspondence relationship between patterns can be attained by repeatedly conducting quite a simple computation. Since the processing is uniformly achieved for the respective neural cells, the computation can be executed in a parallel manner, which may lead to a high-speed processing apparatus.

FIG. 12 is a block diagram showing an embodiment of the distance measuring apparatus in accordance with the present invention. Reference numeral 1210 denotes a right-eye image input section to receive as an input thereto an image from a television camera or other image input device. Reference numeral 1220 is a left-eye image input section to receive as an input thereto a left-eye image obtained at a shooting position apart from the shooting position of the right-eye image. Reference numerals 1230 and 1240 respectively indicate a right-eye image memory and a left-eye image memory for storing therein associated images. Reference numerals 1250 and 1260 denote broken line approximation sections each having a function identical to the function of the broken line approximation section 170 of FIG. 1. Reference numeral 1270 is an associated processing section developing the same function as that of the apparatus of FIG. 10. Reference numeral 1280 is a distance computation section to obtain a distance based on a result from the associated processing section 1270.

The broken line approximation processing sections 1250 and 1260 respectively read from the right-.eye and left-eye image memories 1230 and 1240 brightness patterns of scanning lines forming a pair to transform the pattern data items into respective vector series as an approximation in accordance with the method described in conjunction with FIG. 2. The associated processing section 1270 receives the vector series for the respective scanning lines associated with the right-eye and left-eye images respectively sent from the broken line approximation sections 1250 and 1260. By use of an apparatus identical to the system shown in FIG. 10, the associated processing section 1270 obtains a correspondence relationship between the vector series. The distance computing section 1280 determines the amount of parallax between the right-eye and left-eye images based on the correspondence relationship between the vector series as a processing result of the associated processing section, thereby computing a distance in accordance with the trigonometric principle commonly known.

According to the embodiment above, since the image data is compressed into vector series, the number of computations is reduced and high-speed processing is achieved. Moreover, by use of the correspondence relationship with respect to the vector series, the correspondence relationship can be obtained for the portion other than the edges, which has been impossible in the conventional method. As a result, the performance of the distance measuring apparatus using an image can be remarkably improved.

Figure 13:
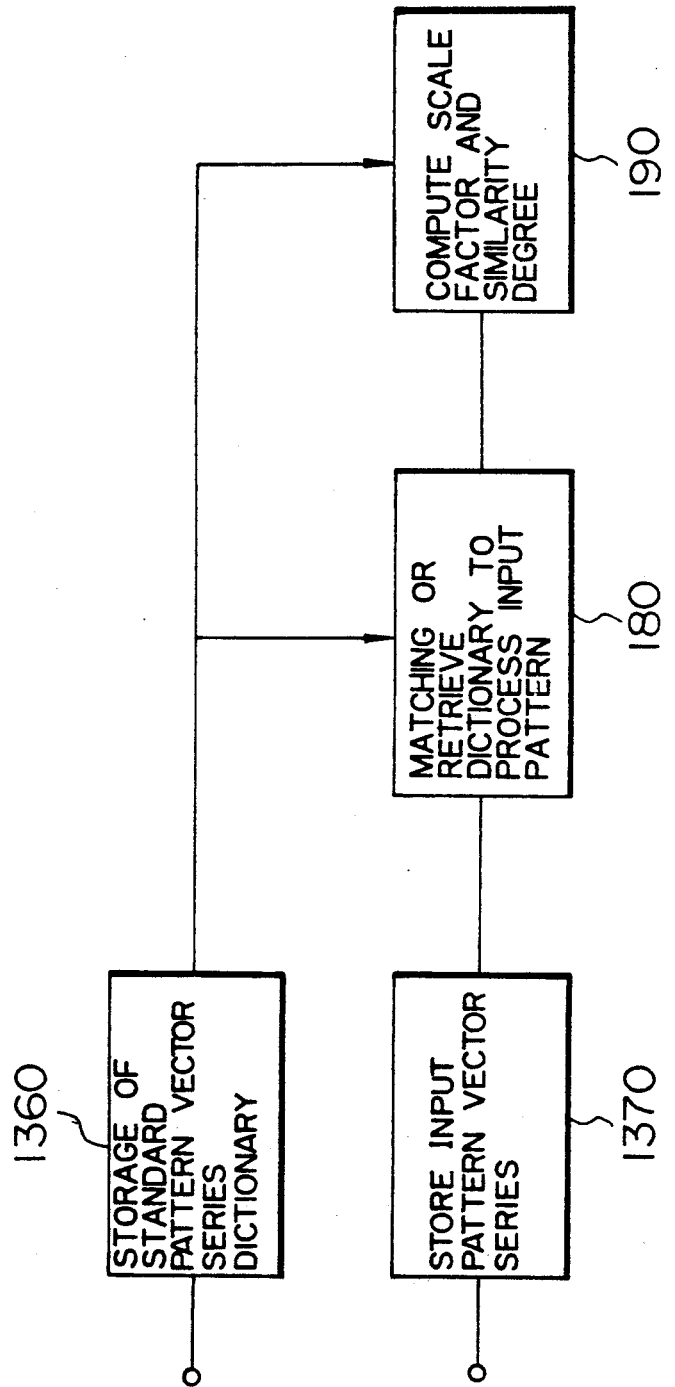
FIG. 13 is a block diagram illustratively showing further an alternative embodiment of a pattern discriminating apparatus according to the present invention.

FIG. 13 shows a pattern discriminating apparatus as still an alternative embodiment in accordance with the present invention. This system comprises means 1360 and 1370 for respectively receiving as inputs thereto a standard pattern expressed as a vector series and a measured pattern vector series, retrieve means 180 for comparing the respective vector series to achieve a retrieval with respect to the input pattern, and similarity degree means 190 for computing a scale reduction ratio or factor and a similarity degree between the vector series. In short, on receiving a plurality of data items collected up to this point, this apparatus can develop a correct discriminating function.

While particular embodiments of the invention have been shown and described, it will be obvious to those skilled in the art that various changes and modifications may be made without departing from the present invention in its broader aspects.

We claim:

1. An apparatus for discriminating a pattern comprising:
   (a) first means for extracting, from an input pattern, first sequential data by use of sum of products representing said input pattern;
   (b) second means for extracting, from the first sequential data, first features represented as a sequence of pairs of an interval and a variation between any concavity and convexity among data of the first sequential data, thereby representing the input pattern as a vector series;
   (c) third means for extracting, from a plurality of standard patterns, second sequential data by use of a sum of products representing the plurality of standard patterns;
   (d) fourth means for extracting, from the second sequential data, second features represented as a sequence of pairs of an internal and a variation between any concavity and convexity among data of the second sequential data, thereby representing the plurality of standard patterns;
   (e) a standard pattern storage for storing therein vector series representing the plurality of standard patterns;
   (f) an input pattern storage for storing therein vector series representing the input pattern;
   (g) retrieve means for searching the vector series of the input pattern to retrieve vector series of the standard patterns therefrom; and
   (h) similarity degree means for computing a similarity degree and a scale factor between the vector series retrieved by said retrieve means and the vector series of the standard patterns stored in said standard pattern storage and for determining standard patterns having a larger similarity degree and having a scale factor within a preset range with respect to the retrieved vector series.

2. An apparatus according to claim 1 wherein said similarity degree means includes store means for storing therein numbers assigned to standard patterns each having a similarity degree not less than a predetermined value and a scale factor within a preset range centered on one, said numbers being arranged in association with numbers assigned to the retrieved vector series of the input pattern.

3. An apparatus according to claim 1 further comprising store means for storing names assigned to respective vectors of the standard patterns, said names representing with words characteristics thereof in association with a variation in the value of the vector series, said words being fundamentally increasing, flat, and decreasing.

4. An apparatus according to claim 1 further comprising a neural net in which the vector series respectively of the standard and input patterns are supplied and which achieves a retrieval between the vector series.

5. A pattern discriminating apparatus comprising:
(a) first means for extracting, from an input pattern, first sequential data by use of sum of products representing the input pattern;
(b) second means for extracting, from the first sequential data, first features represented as a sequence of pairs of an interval and a variation between any concavity and convexity among data of the first sequential data, thereby representing the input pattern as a vector series;
(c) third means for extracting, from a plurality of standard patterns, second sequential data by use of sum of products representing the plurality of standard patterns;
(d) fourth means for extracting, from the second sequential data, second features represented as a sequence of pairs of an interval and a variation between any concavity and convexity among data of the second sequential data, thereby representing the plurality of standard patterns;
(e) fifth means for storing therein the first sequential data of the input pattern and the second sequential data of a plurality of standard patterns;
(f) sixth means for comparing the first and second sequential data to retrieve, from the input pattern vector series, a sequence of vector series including a vector series of one of the standard patterns; and
(g) seventh means for computing a similarity degree, represented by using sum of inner products, and a scale factor representing a scale reduction ratio between the vector series retrieved by said sixth means and the vector series of the standard patterns stored in said fifth means.

6. An apparatus according to claim 5 wherein said second means includes:
a) means for computing a convolution of an input pattern f(t), (t=0, 1, 2, ..., T) with an expression $$W_2(x) = \frac{1}{(8\pi\sigma^{10})^{\frac{1}{4}}}(x^2 - \sigma^2)\exp\left(-\frac{x^2}{2\sigma^2}\right)$$

($\sigma$; constant)

to get a result $$g_2(t) = \sum_{x=-a}^{a} f(t+x)W_2(x)$$

and for extracting from the result points having positive and negative maximal values as feature points $\sigma_1$, $\tau_2$, ..., $\tau_k$ of the input pattern;
b) average means for computing a convolution based on an expression $$W_0(x) = \frac{1}{(2\pi\sigma^2)^{\frac{1}{4}}}\exp\left(-\frac{x^2}{2\sigma^2}\right)$$

($\sigma$; constant)

to obtain a result $$g_0(\tau_i) = \sum_{x=-a}^{a} f(\tau_i + x)W_0(x)$$

($i = 1, 2, ..., k$)

and for attaining a mean value of the input pattern at each said feature point;
c) means for computing, based on results $g_2(\tau_i)$ and $g_0(\tau_i)$ from the convolution at the feature points $\tau_i$ ($i=1, 2, ..., k$), an expression $$\hat{f}(\tau_i) = g_0(\tau_i)W_0(0) + g_2(\tau_i)W_2(0)$$

to obtain estimation values ($\tau_i$) of the input pattern at the feature points $\tau_i$;
d) means for determining regression lines $h_1(t)$ and $h_k(t)$ respectively passing the estimation values ($\tau_1$) and ($\tau_k$) of the input pattern in respective ranges $0 \leq t \leq \tau_1$ and $\tau_k \leq t \leq T$ to compute estimation values (0) and f(T) of both ends of the input pattern from expressions $$\hat{f}(0) = h_1(0)$$

$$\hat{f}(T) = h_k(T); \text{ and}$$

e) means for computing a vector series $\vec{a}_i$ ($i=1, 2, ..., k+1$) representing a broken line as an approximation of the input pattern from expressions $$\begin{cases} \vec{a}_1 = (\tau_1, \hat{f}(\tau_i) - \hat{f}(0)) \\ \vec{a}_i = (\tau_i - \tau_{i-1}, \hat{f}(\tau_i) - \hat{f}(\tau_{i-1})) \\ \vec{a}_{k+1} = (T - \tau_k, \hat{f}(T) - \hat{f}(\tau_k)) \end{cases}$$

($i = 2, 3, ..., k$)

7. An apparatus according to claim 5 wherein the vector series of the standard patterns stored in said fifth means are assigned with names depending on a gradient of vectors associated with features of the respective vectors thereof and
said sixth means comprises:
a) name means for assigning to the vector series of the input pattern, in association with the features of the respective vectors thereof, the same names assigned to the vector series of the standard patterns; and
b) name retrieve means for retrieving a portion from a sequence of the names associated with the vector series of the input pattern, said portion including a sequence of names of vector series of the standard patterns.

8. An apparatus according to claim 5 wherein said fourth means includes means for computing the similarity degree and the scale factor from expressions $$S = \frac{\sum\limits_{i=1}^{m}\left(\vec{s_i}, \sum\limits_{j=1}^{n_i}\vec{a_{ij}}\right)}{\sqrt{\sum\limits_{i=1}^{m}|\vec{s_i}|^2}\sqrt{\sum\limits_{i=1}^{m}\left(\sum\limits_{j=1}^{n_i}|\vec{a_{ij}}|\right)^2}}$$

$$K = \frac{\sum\limits_{i=1}^{m}\left(\vec{s_i}, \sum\limits_{j=1}^{n_i}\vec{a_{ij}}\right)}{\sum\limits_{i=1}^{m}|\vec{s_i}|^2}$$

where, (,) designates an inner product of vectors, $\vec{s_i}$ (i=1, 2, ..., m) is a vector series of the standard patterns, and $\vec{a_{ij}}$ (j=1, 2, ..., $n_i$) stands for a vector series of the input pattern associated with the standard pattern vector series $s_i$.

9. An apparatus according to claim 5 wherein in an operation to store the standard patterns in said fifth means, a desired standard pattern is drawn on an input device having a pattern drawing capability such that said second means conducts the processing on the pattern to attain a vector series, thereby loading said fifth means with the obtained vector series.

10. An apparatus according to claim 5 comprising means for transforming input information into a symbol representing a contour of a pattern and for accumulating their the symbol.

11. An apparatus according to claim 10 including means for converting a control state of a process into a symbol representing a pattern registered to a standard pattern dictionary and for retrieving a preceding process state represented with a symbol identical to the symbol of the pattern, thereby conducting a comparison.

12. An apparatus according to claim 11 comprising means for computing a selection or a computation of rules beforehand stored for control by use of a symbol representing a process state, the symbol being outputted from said converting means.

13. An apparatus for discriminating a correspondence relationship between two patterns respectively transformed into vector series comprising:

(a) first means for extracting, from an input pattern, first sequential data by use of sum of products representing the input pattern;

(b) second means for extracting, from the first sequential data, first features represented as a sequence of pairs of an interval and a variation between any concavity and convexity among data of the first sequential data, thereby representing the input pattern as a vector series;

(c) third means for extracting, from a plurality of standard patterns, second sequential data by use of sum of products representing the plurality of standard patterns;

(d) fourth means for extracting, from the second sequential data, second features represented as a sequence of pairs of an interval and a variation between any concavity and convexity among data of the second sequential data, thereby representing the plurality of standard patterns;

(e) fifth means for storing therein the first sequential data of the input pattern and the second sequential data of a plurality of standard patterns;

(f) sixth means for comparing the first and second sequential data to retrieve, from the input pattern vector series, a sequence of vector series including a vector series of one of the standard patterns; and (g) seventh means for computing a similarity degree, represented by using sum of inner products, and a scale factor representing a scale reduction ratio between the vector series retrieved by said sixth means and the vector series of the standard patterns stored in said fifth means, wherein said fifth means comprises:

a) first submeans for storing therein a matching degree S(i, j) (i=1, 2, ..., m; j=1, 2, ..., n) between a vector series $\vec{a_i}$ (i=1, 2, ..., m) constituting a pattern and a vector series $\vec{b_j}$ (j=1, 2, ..., n) configuring another pattern;

b) second submeans for storing therein a correspondence degree U(i, j), (i=1, 2, ..., m; j=1, 2, ..., n) between a vector $\vec{a_i}$ of the pattern (1) and a vector $\vec{b_j}$ of the pattern (2);

c) third submeans for storing therein outputs V(i,j), i=1, 2, ..., m; j=1, 2, ..., n) obtained through an appropriate transformation $$V(i,j) = f[U(i,j)]$$

conducted on the respective values of the correspondence degrees U(i,j) stored in said subsecond means;

d) fourth submeans for updating the values of the correspondence degree U(i,j) by use of the matching degree S(i,j) loaded in said fist submeans, the correspondence degree U(i,j) stored in said second submeans, and the output V(i,j) stored in said third submeans; and e) fifth submeans operative after the processing of said second, third, and fourth submeans is interatively accomplished an appropriate number of times for attaining a correspondence relationship between the vector series $\vec{a_i}$ (i=1, 2, ..., m) of the pattern (1) and the vector series $\vec{b_j}$ (j=1, 2, ..., n) of the pattern (2) by use of the correspondence degree U(i,j), (i=1, 2, ..., m; j=1, 2, ..., n) stored in said second submeans.

14. An apparatus according to claim 13 wherein the matching degree S(i,j) stored in said first submeans is an inner product between the vector $\vec{a_i}$ and the vector $\vec{b_j}$.

15. An apparatus according to claim 13 wherein the output V(i,j) stored in said third submeans is attained from the correspondence degree U(i,j) based on $$V(i,j) = f[U(i,j)]$$

by use of a function $$f(x) = \frac{1}{1 + \exp(-\alpha x + \theta)}$$

16. An apparatus according to claim 13 wherein the computation of said fourth submeans is achieved according to an expression $$U(i,j;\, t+1) = A_1 U(i,j;\, t) +$$

-continued $$A_2 \left\{ \sum_{k,l} W(i,j;i',j')V(i',j';t) + S(i,j) - H(i,j) \right\}$$

where, $A_1$, $A_2$, and $H(i,j)$ respectively designate appropriate constants and $W(i,j;i',j')$ denotes a weight coefficient indicating a relationship between $V(i',j';t)$ and $U(i,j;t+1)$.

17. A method of discriminating an input pattern with respect to standard patterns in an apparatus having a storage, compute means, and retrieve means, to identify a pattern, said method comprising the steps of:
 (a) extracting, from an input pattern, first sequential data by use of sum of products representing the input pattern;
 (b) extracting, from the first sequential data, first features represented as a sequence of pairs of an interval and a variation between any concavity and convexity among data of the first sequential data, thereby representing the input pattern as a vector series;
 (c) extracting, from a plurality of standard patterns, second sequential data by use of sum of products representing the plurality of standard patterns;
 (d) extracting, from the second sequential data, second features represented as a sequence of pairs of an interval and a variation between any concavity and convexity among data of the second sequential data, thereby representing said plurality of standard patterns;
 (e) storing the first sequential data of the input pattern and the second sequential data of the plurality of standard patterns in said storage;
 (f) comparing the first and second sequential data to retrieve, from the input pattern vector series, a sequence of vector series including a vector series of one of the standard patterns; and
 (g) computing a similarity degree, represented by using sum of inner products, and a scale factor representing a scale reduction ratio between the vector series retrieved by step (f) and the vector series of the standard patterns stored in step (e).

18. A method according to claim 17 further including storing numbers assigned to standard patterns having a similarity degree not less than a preset value and a scale reduction ratio in a predetermined range centered on one, the numbers being associated with numbers assigned to the retrieved vector series of the input pattern.

19. A method according to claim 17 further including determining a name for each vector of the vector series of the standard pattern in association with a variation of values thereof, the name representing with a word such a feature thereof as increasing, flat, or decreasing.

20. A pattern discriminating apparatus comprising:
 a) first means for extracting from an input pattern features associated with concavity and convexity thereof and for approximating the input pattern to a broken line based on the features, thereby representing the input pattern as a vector series constituting the broken line;
 b) second means for storing therein the input pattern and a plurality of standard patterns to be compared therewith in a form of vector series respectively representing folded lines, said broken lines being associated with symbols;
 c) third means for comparing the vector series of the input pattern from said first means and the vector series of the standard patterns from said second means to retrieve from the input pattern vector series a sequence of vector series including vector series of the standard patterns; and
 d) fourth means for computing a similarity degree and a scale factor between the vector series retrieved by said third means and the vector series of the standard patterns stored in said second means,
wherein said first means includes:
 (1) means for computing a convolution of an input pattern $f(t)$, ($t=0, 1, 2, \ldots, T$) with an expression $$W_2(x) = \frac{1}{(8\pi\sigma^{10})^{\frac{1}{2}}} (x^2 - \sigma^2)\exp\left(-\frac{x^2}{2\sigma^2}\right)$$

($\sigma$; constant)

to get a result $$g_2(t) = \sum_{x=-a}^{a} f(t+x)W_2(x)$$

and for extracting from the result points having positive and negative maximal values as feature points $\tau_1, \tau_2, \ldots, \tau_k$ of the input pattern;
 (2) average means for computing a convolution based on an expression $$W_0(x) = \frac{1}{(2\pi\sigma^2)^{\frac{1}{2}}} \exp\left(-\frac{x^2}{2\sigma^2}\right)$$

($\sigma$; constant)

to obtain a result $$g_0(\tau_i) = \sum_{x=-a}^{a} f(\tau_i + x)W_0(x)$$

($i = 1, 2, \ldots, k$)

and for attaining a mean value of the input pattern at each said feature point;
 (3) means for computing, based on the results $g_2(\tau_i)$ and $g_0(\tau_i)$ from the convolution at the feature points $\tau_i$ ($i=1, 2, \ldots, k$), an expression $$\hat{f}(\tau_i) = g_0(\tau_i)W_0(0) + g_2(\tau_i)W_2(0)$$

to obtain estimation values $(\tau_i)$ of the input pattern at the feature points $\tau_i$;
 (4) means for determining regression lines $h_1(t)$ and $h_k(t)$ respectively passing the estimation values $(\tau_i)$ and $(\tau_k)$ of the input pattern in respective ranges $0 \leq t \leq \tau_1$ and $\tau_k \leq t \leq T$ to compute estimation values (0) and (T) of both ends of the input pattern from expressions $$\hat{f}(0) = h_1(0)$$

$$\hat{f}(T) = h_k(t); \text{ and}$$

(5) means for computing a vector series $\vec{a}_i$ ($i=1, 2, \ldots, k+1$) representing a broken line as an approximation of the input pattern from expressions $$\begin{cases} \vec{a_1} = (\tau_1, \hat{f}(\tau_i) - \hat{f}(0)) \\ \vec{a_i} = (\tau_i - \tau_{i-1}, \hat{f}(\tau_i) - \hat{f}(\tau_{i-1})) \\ \vec{a_{k+1}} = (T - \tau_k, \hat{f}(T) - \hat{f}(\tau_k)) \end{cases}$$

$(i = 2, 3, \ldots, k)$

* * * * *

$$\begin{cases} \vec{a_1} = (\tau_1, \hat{f}(\tau_i) - \hat{f}(0)) \\ \vec{a_i} = (\tau_i - \tau_{i-1}, \hat{f}(\tau_i) - \hat{f}(\tau_{i-1})) \\ \vec{a_{k+1}} = (T - \tau_k, \hat{f}(T) - \hat{f}(\tau_k)) \end{cases}$$

$(i = 2, 3, \ldots, k)$

* * * * *